United States Patent [19]
Winkler et al.

[11] 3,968,878
[45] July 13, 1976

[54] CIRCULAR MAGAZINE FOR PHOTOGRAPHIC TRANSPARENCIES

[75] Inventors: Alfred Winkler, Munich; Albert Eggering, Leverkusen; Volkmar Stenzenberger; Herbert Wilsch, both of Unterhaching, all of Germany

[73] Assignee: AGFA-Gevaert, A.G., Leverkusen, Germany

[22] Filed: Jan. 17, 1974

[21] Appl. No.: 434,293

[30] Foreign Application Priority Data
Jan. 20, 1973  Germany............................ 2302881
Sept. 15, 1973  Germany............................ 2346596

[52] U.S. Cl.................................. 206/455; 40/79; 353/117
[51] Int. Cl.²......................................... G03B 23/06
[58] Field of Search .... 40/79; 206/72, 73, 455–456; 353/116, 117

[56] References Cited
UNITED STATES PATENTS
3,304,639  2/1967  Wiklund ............................. 40/79 X
3,402,489  9/1968  Schlessel............................ 40/79 X
3,413,062  11/1968  Zillmer ............................... 40/79 X
3,843,247  10/1974  Sobotta............................... 353/117

Primary Examiner—Steven E. Lipman
Attorney, Agent, or Firm—Michael J. Striker

[57] ABSTRACT

A round tray for photographic transparencies has a bottom wall, a ring-shaped inner wall and radially extending partitions which are rigid with the two walls and define an annulus of compartments for transparencies. At least a portion of each partition resembles a wedge or sector whose width increases radially outwardly so that the parts of compartments between such portions have a constant width to thus prevent excessive changes in orientation of inserted transparencies. The transparencies may be yieldably held in the respective compartments by discrete leaf springs which are secured to a cover overlying the bottom wall and separably attached to the inner wall, or by bifurcated elastic parts of the partitions. The elastic parts may have wedge-like protuberances engaging the transparencies in the adjacent compartments with a force which suffices to prevent unintentional ejection or misalignment of transparencies but is too weak to prevent a slide changer from expelling a transparency from, or from returning a transparency into, the respective compartment.

40 Claims, 9 Drawing Figures

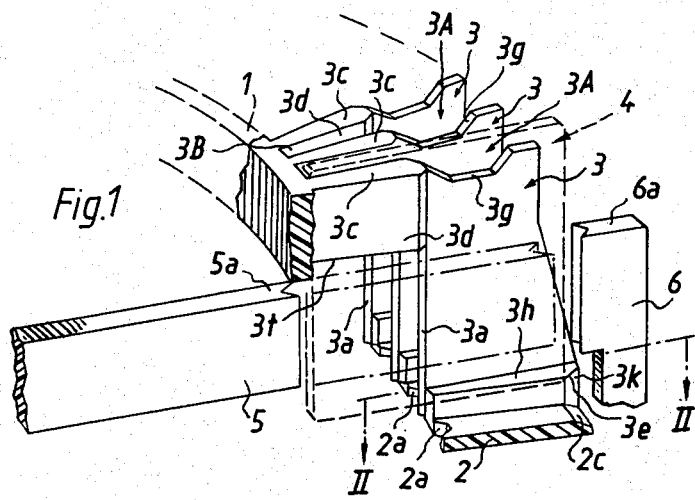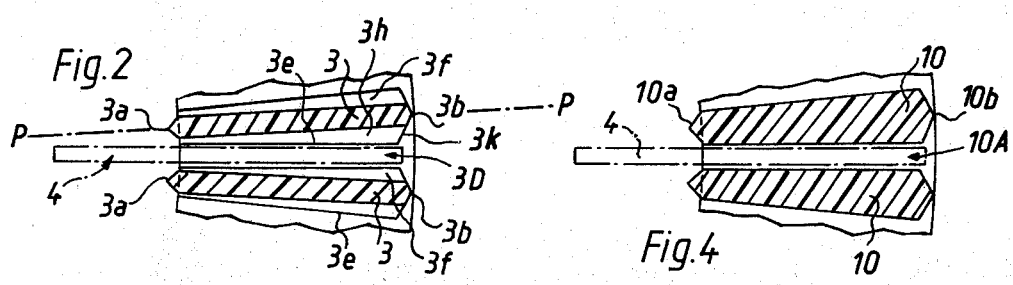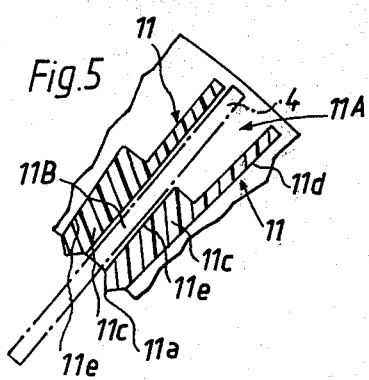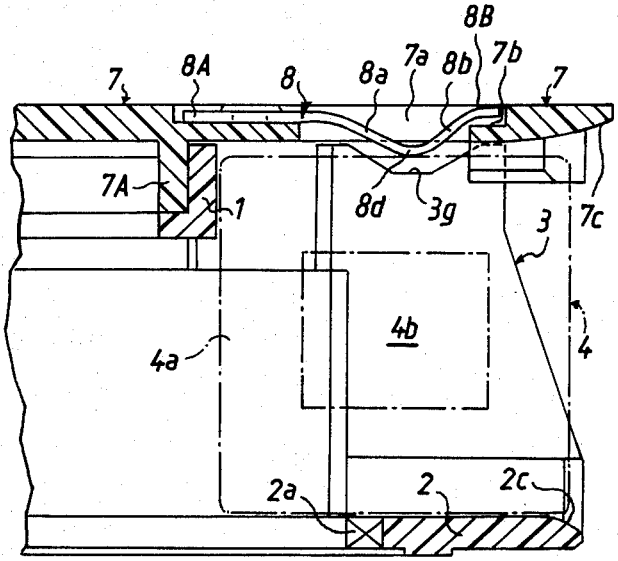

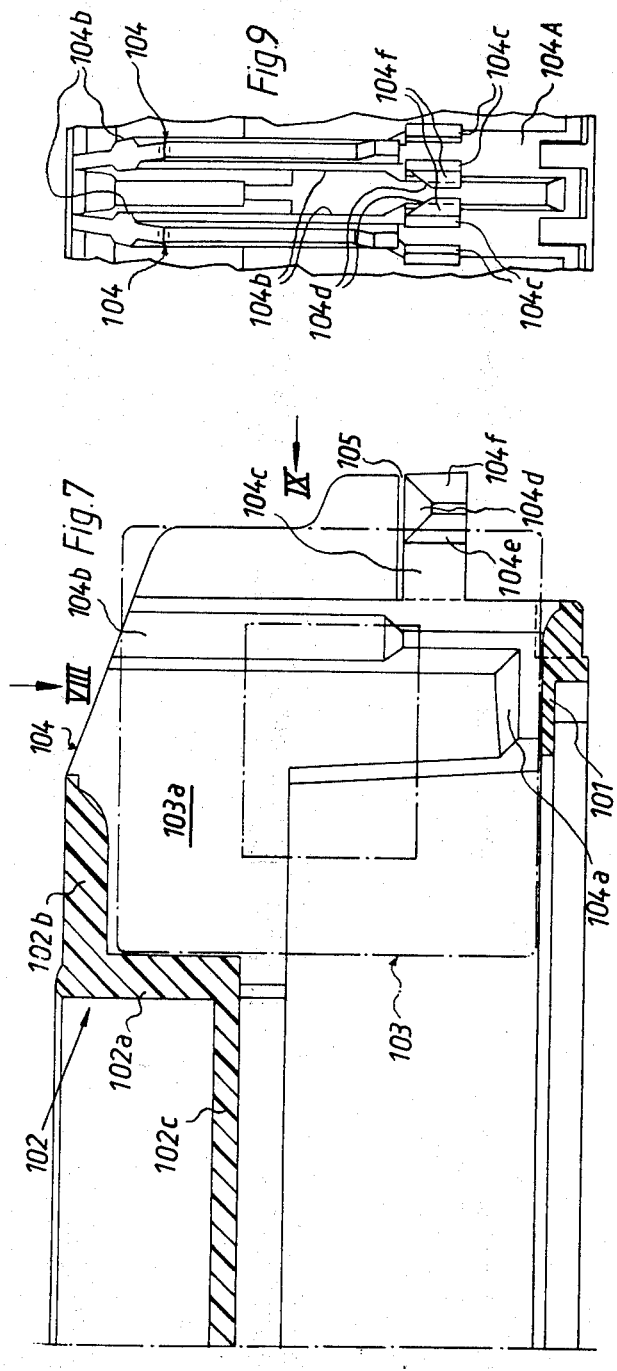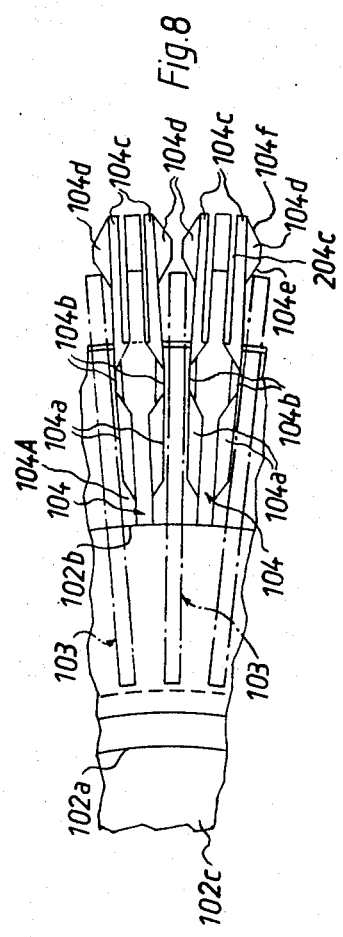

CIRCULAR MAGAZINE FOR PHOTOGRAPHIC TRANSPARENCIES

BACKGROUND OF THE INVENTION

The present invention relates to magazines or trays for photographic transparencies of the type commonly known as slides, and more particularly to improvements in round or circular magazines or trays for photographic transparencies.

In presently known round trays, the partitions between neighboring compartments for slides have a constant thickness all the way between their radially innermost and outermost ends. Consequently, each compartment resembles a sector whose width, as considered in the circumferential direction of the tray, increases gradually from the inner toward the outer end. If the compartments receive relatively thin slides, i.e., slides wherein the exposed and developed film frames are installed in relatively thin metallic, plastic or paper mounts, the slides (and especially the outer portions of the slides) have substantial freedom of movement in the circumferential direction of the tray. This is undesirable because the orientation of slides with respect to the surface of neighboring partitions can vary from compartment to compartment which is likely to affect the operation of the slide changing mechanism or the gravitational descent of slides to a projection position. Since the slide changer or changers must have a certain freedom of movement with respect to the adjacent partitions, the clearances with which the slides are received in their compartments and the play which is provided for the slide changer or changers can result in substantial misalignment between the slides and the slide changer or changers which often causes jamming, damage to the mounts of slides, damage to the exposed and developed film frames in the mounts and/or other inconveniences. Such problems are particularly likely to arise when the film frames of the slides are installed in relatively thin mounts.

SUMMARY OF THE INVENTION

An object of the invention is to provide a novel and improved circular or round magazine or tray for photographic transparencies or slides wherein the slides can be held in an optimum position for gravity feed or for positive displacement to a projection position for viewing.

Another object of the invention is to provide a round tray with novel and improved partitions which define compartments for photographic transparencies or slides.

A further object of the invention is to provide a round tray with a novel and improved cover for the compartments which receive photographic transparencies.

An additional object of the invention is to provide a round tray which can be used in existing slide projectors as a superior substitute for presently known round trays.

Still another object of the invention is to provide a round tray wherein all, or practically all slides are maintained in the same orientation, not only during their dwell in the respective compartments but also during transport or gravitational descent to a projection position as well as during return movement into the respective compartments.

A further object of the invention is to provide a round tray which can be used with advantage for the storage of extremely thin photographic transparencies and wherein the jamming, deformation and/or other damage to transparencies is much less likely than in heretofore known round trays.

Another object of the invention is to provide a round tray which can be used with equal advantage for gravity feed as well as for radial transport of photographic transparencies to and from a projection position for viewing.

The invention is embodied in a round tray for photographic transparencies which comprises an annulus of equidistant radially extending partitions defining radially extending compartments for photographic transparencies, and wall means connected with the partitions. In accordance with a feature of the invention, at least a portion of each partition defines with the neighboring partition at least one passage having a substantially constant width and forming part of the respective compartment. The width of such portion of portions of each partition increases radially outwardly, i.e., in a direction away from the axis of the tray.

In accordance with a first embodiment of the invention, each of the aforementioned portions is located at one side of the respective partition and defines the corresponding passage with the other side of the neighboring partition. In accordance with a second embodiment of the invention, each such portion of a partition includes two substantially wedge-like halves which extend from the opposite sides of the respective partition, as considered in the circumferential direction of the tray. In accordance with a third embodiment of the invention, each partition may constitute in its entirety a sector whose width increases gradually in a direction radially outwardly so that each of the aforementioned passages constitues an entire compartment of substantially constant width.

If the tray is designed for use in a slide projector wherein the transparencies are movable radially of the tray to and from a predetermined projection position, it must cooperate with one or more slide changers having leading portions which should be capable of entering the compartments in order to expel a transparency for transfer to projection position for viewing or to return a transparency back into the respective compartment. In such instances, at least a portion of each compartment has a width which at least slightly exceeds the thickness of the leading portion of a slide changer; this insures that such leading portion can enter a selected compartment. It is often preferred to design the tray in such a way that the aforementioned passage or passages of the compartments are adjacent to those portions which are to receive the leading portions of slide changers, i.e., the aforementioned passages need not coincide with those portions of compartments into which a slide changer enters during removal or reentry of transparencies.

In accordance with a presently preferred embodiment of the invention, each partition has a radially extending central plane and each of the aforementioned portions of the partitions includes two wedge-like halves which are mirror symmetrical to each other with reference to the respective central plane. The width of each such half preferably increases gradually radially outwardly from the inner toward the outer edge of the respective partition.

It is also within the purview of the invention to provide the tray with means for yieldably holding transparencies in the respective compartments; such means may include discrete springs secured to a cover which is separably connectable to the wall means, or such means may constitute integral parts (e.g., elastically deformable arms or prongs) of the partitions.

The novel features which are considered as characteristic of the invention are set forth in particular in the appended claims. The improved magazine or tray itself, however, both as to its construction and the mode of making and using the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a round tray with radially extending partitions which define compartments for photographic transparencies and embody one form of the invention, with the cover of the tray removed;

FIG. 2 is a fragmentary horizontal sectional view as seen in the direction of arrows from the line II—II of FIG. 1;

FIG. 3 is an enlarged fragmentary axial sectional view of the fully assembled tray;

FIG. 4 is a fragmentary horizontal sectional view of a second tray having modified partitions;

FIG. 5 is a similar fragmentary horizontal sectional view of a third tray;

FIG. 7 is a fragmentary axial sectional view of the fourth tray;

FIG. 8 is a fragmentary plan view of the fourth tray as seen in the direction of arrow VIII in FIG. 7; and FIG. 9 is a fragmentary and elevational view of the fourth tray as seen in the direction of arrow IX in FIG. 7.

DESCRIPTION OF THE PREFFERRED EMBODIMENTS

Figure 6:
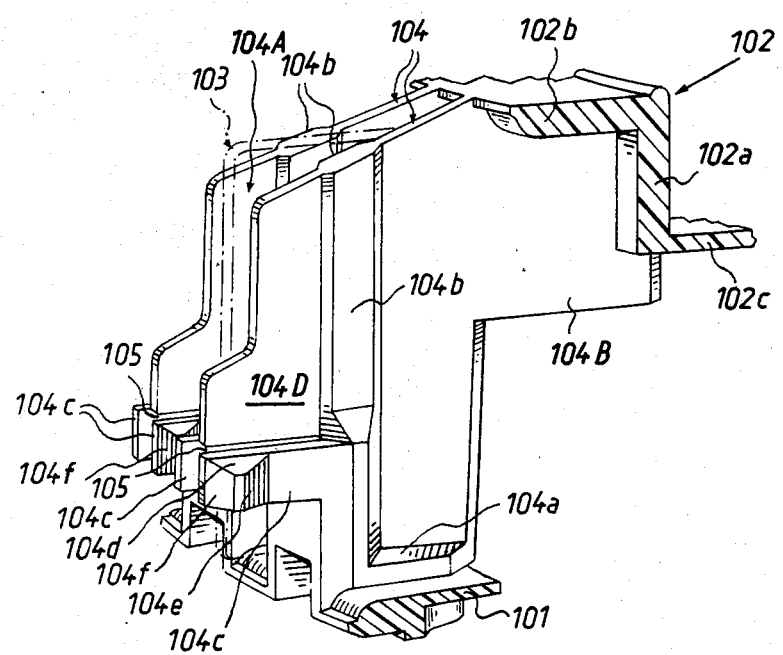
FIG. 6 is a fragmentary perspective view of a fourth tray.

FIGS. 1 to 3 show a portion of a round or circular magazine or tray which consists of synthetic plastic material. The tray comprises wall means including a ring-shaped inner wall 1 and an annular bottom wall 2, and a set or annulus of equidistant substantially radially extending partitions 3 which connect the walls 1 and 2 to each other and define a set or annulus of substantially radially extending compartments 3A for photographic transparencies or slides 4 (indicated by broken or phantom lines). If the tray is indexible about a vertical axis, the annular bottom wall 2 is located at a level below the lower edge of the inner wall 1 (see FIGS. 1 and 3). The plane of the bottom wall 2 is assumed to be normal to the axis of the tray, and the axis of the inner wall is assumed to coincide with the axis of the tray. The inner marginal portion of the bottom wall 2 is formed with an annulus of teeth 2a which mesh with a suitable pinion (not shown) of the indexing mechanism for the tray. Such indexing mechanisms are well known from the art of slide projectors using round trays. Their purpose is to index the tray stepwise or by several steps so as to place successive or selected slides 4 into register with the slide changers 5 and 6. The slide changer 5 is reciprocable radially of the tray and is shown in FIG. 1 in a retracted position in which it is located radially inwardly of the inner wall 1. The other slide changer 6 is aligned with the slide changer 5 but is shown as being located without the tray. When a slide 4 is to be moved to a projection position in which its film frame 4b extends across the axis of the optical system of the slide projector, the slide changers 5, 6 are moved in a direction to the right, as viewed in FIG. 1, to move the respective slide radially of and away from the axis of the tray. Upon completion of the viewing of a slide 4 in projection position, the slide changers 5, 6 move back to the positions shown in FIG. 1 to thereby return the slide from the projection position into the respective compartment 3A before the tray is indexed by one or more steps. It is clear that the teeth 2a can be provided on the outer marginal portion of the bottom wall 2; however, the arrangement of FIGS. 1 and 3 is preferred at this time because it contributes to a reduction of the dimensions of the tray, as considered in the radial direction. Each slide 4 is assumed to have a thin metallic, plastic or paper mount 4a which surrounds the exposed and developed film frame 4b (see FIG. 2). As stated before, that part of the tray which is shown in FIGS. 1 to 3 is assumed to consist of a single piece of synthetic plastic material, i.e., the partitions 3a are assumed to be integral with the walls 1 and 2. Such part of the tray can be produced by injection molding or by resorting to another suitable technique.

Portions of the partitions 3 are of constant thickness and each thereof has a substantially rectangular cutout 3t in the region below the lower edge of the inner wall 1 and radially inwardly of the bottom wall 2. The minimum distance between two neighboring partitions 3 at least slightly exceeds the thickness of the slide changer 5 and/or 6 so as to insure that such slide changers can extend into the compartments 3A with at least some clearance. It is preferred to provide each partition 3 with substantially wedge-shaped axially parallel inner and outer edge portions 3a, 3b (see particularly FIG. 2) whose inclined surfaces serve to guide the slide changer 5 or 6 and/or the mount 4a of a slide 4 into the respective compartment 3A. Thus, when the slide changer 5 is about to push the slide 4 of FIG. 2 in a direction to the right, its leading portion 5a can engage the adjacent inclined surface of one of the two adjacent inner edge portions 3a so that the leading portion 5a can readily find its way into the respective compartment 3A. The outer edge portions 3b perform a similar function in connection with the leading portion 6a of the slide changer 6.

In accordance with a feature of the invention, each partition 3 further comprises at least one portion of increased thickness to reduce the extent of possible misalignment of slides 4 (even of slides having very thin mounts) to a permissible value. In the embodiment of FIGS. 1 to 3, the upper part of each partition 3 constitutes a sector-shaped portion 3c which extends from the external surface of the inner wall 1 and substantially halfway to the respective outer edge portion 3b. Thus, each portion 3c is adjacent to the upper radially extending edge of the respective partition 3. Each sector-shaped portion 3c has a symmetry plane which coincides with the central plane P—P of the entire partition 3 and includes the axis of the tray. Thus, each such sector-shaped portion 3c includes two wedge-like parts or halves are mirror symmetrical to each other with reference to the central longitudinal plane P—P of the partition 3. The configuration of the sector-shaped portions 3c is preferably such that the side faces or flanks 3d of two neighboring sector-shaped portions 3c define a channel or passage 3B which has a constant width and constitutes the upper part of the inner portion of the respective compartment 3A. The width of the channel or passage 3B at least slightly exceeds the thickness of the mount 4a of a slide 4 and the thickness of the leading portion 5a of the slide changer 5. This width is selected with a view to prevent excessive misalignment of a slide 4 as well as to prevent the sector-shaped portions 3c from interfering with the penetration of slide changer 5 into the compartments 3A.

In order to further reduce the likelihood of excessive misalignment of slides 4 in the compartments 3A, the lower portion of each partition 3 (at a level below the lower edge of the inner wall 1) includes an auxiliary aligning portion consisting of two radially outwardly diverging extensions or halves 3e and 3f (best shown in FIG. 2) each of which constitutes a substantially wedge-shaped enlargement and which are preferably mirror symmetrical to each other with reference to the central symmetry plane P—P of the respective partition 3, i.e., the same as the halves of a portion 3c. The side face or flank of an extension 3e is preferably parallel to the side face or flank of the adjacent extension 3f to define therewith an auxiliary or second channel or passage 3D constituting the lowermost portion of the respective compartment 3A. The extensions 3e, 3f are adjacent to the lower radially extending edges of the respective partitions 3. The width of each passage 3D preferably equals or closely approximates the width of a passage 3B. The extensions 3e, 3f are preferably located at a level below the path of movement of the slide changers 5, 6 and may extend all the way to the upper side of the bottom wall 2. As shown in FIGS. 1 to 3, the sector-shaped portions 3c as well as the sector-shaped portions including the extensions or halves 3e, 3f are preferably provided with suitably inclined edge faces (see the edge faces 3h, 3k of the foremost extension 3e shown in FIG. 1 and of the upper extension 3e shown in FIG. 2) to allow for convenient introduction of slide mounts 4a into the respective channels or passages 3D. The passages 3B, 3D are adjacent to those portions of a compartment 3A which receive the slide changer 5 or 6.

As explained above, the width of the passages 3B and 3D preferably at least slightly exceeds the thickness of a slide mount 4a and/or the thickness of the leading portion 5a or 6a of the slide changer 5 or 6. In order to further reduce the likelihood of misalignment of slides 4 in the respective compartments 3A, the tray of FIGS. 1 to 3 is provided with a removable circular or polygonal cover or lid 7 (shown in FIG. 3) which can serve several purposes, namely, to serve as a support for means which yieldably hold the slides 4 in the respective compartments 3A, to allow for a partial or complete inversion or substantial tilting of the tray without ejection or even partial misalignment of the slides, to protect the inserted slides from dust and/or other foreign matter, and to allow for the stacking of two or more trays on top of each other. The cover 7 has a ring-shaped skirt 7A which can be inserted into and frictionally or otherwise held in the inner wall 1 in any one of several predetermined angular positions. The cover 7 is formed with a number of radially extending cutouts or slots 7a each of which is in register with a different compartment 3A when the cover is properly secured to the inner wall 1 in one of the aforementioned predetermined angular positions.

Each slot 7a receives the median portion of a relatively weak leaf spring 8 having an inner end portion 8A which is glued, riveted or otherwise secured to the cover 7 inwardly of the respective slot 7a. Each leaf spring 8 further comprises a free (unattached) outer end portion 8B which tends to bear against an abutment or shoulder 7b provided in the cover 7 radially outwardly of the respective slot 7a. The median portion of each spring 8 has two elongated legs 8a, 8b which make an oblique or right angle and the meeting portion 8d of which yieldably engages and holds the top edge of a mount 4a in the respective compartment 3A when the cover 7 is properly attached to the inner wall 1. In fact, when the compartment 3A below a leaf spring 8 contains a slide 4, the mount 4a of such slide causes the leaf spring 8 to undergo some deformation so that its outer end portion 8B is lifted off the respective shoulder 7b (see FIG. 3). The leaf springs 8 are mounted in the cover 7 in a slightly prestressed condition so that their outer end portions 8B normally bear against the adjacent shoulders 7b with a certain force which suffices to insure that the meeting portion 8d properly engages and holds a mount 4a in the respective compartment 3A. When a compartment 3A is empty, the portion 8d of the respective leaf spring 8 extends downwardly to a level below the level of the upper edge of a properly inserted mount 4a.

When the slide 4 of FIG. 3 is removed from its compartment 3A, the leaf spring 8 is permitted to move its portion 8d downwardly and to move its outer end portion 8B into engagement with the shoulder 7b. When the slide 4 is thereupon returned into the compartment shown in FIG. 3, its mount 4a engages and slides along the leg 8b to deform the leaf spring 8 back to the shape shown in FIG. 3.

The top faces of the partitions 3 are preferably provided with notches 3g which are deep enough to avoid any contact between the leaf springs 8 and the partitions 3 even if the cover 7 is not attached to the wall 1 in one of the predetermined angular positions. Thus, a notch 3g preferably receives with at least some clearance the legs 8a, 8b as well as the meeting portion 8d of the adjacent leaf spring 8, even at a time when the outer end portion 8B of such leaf spring bears against the respective shoulder 7b. The notches 3g constitute an optional feature of the invention, especially if the width of the leaf springs 8 (as considered in the circumferential direction of the tray) does not exceed the width of a compartment 3A and if the cover 7 can be attached to the wall 1 only in such angular position or positions that each leaf spring 8 exactly overlies one of the compartments 3A. The notches 3g preferably serve the additional purpose of facilitating the lifting of slides 4 out of the respective compartments 3A. As shown in FIG. 3, the upper portion of the mount 4a extends sufficiently above the deepmost portion of the notch 3g to enable the operator of the slide projector to grasp the exposed portion of the mount 4a with two fingers, provided that the cover 7 has been detached from the inner wall 1. The provision of notches 3g is desirable on the additional ground that the parts of the tray might not be machined or otherwise finished with a very high degree of precision and that the mounting of all leaf springs 8 might not be exactly uniform so that allowances should be made to permit for satisfactory assembly of the tray and insertion of a slide 4 into each compartment 3A even if the tray is not finished with a very high degree of precision.

In addition to the aforementioned features, the improved tray exhibits the advantage that its overall height, as considered in the axial direction of the inner wall 1, need not appreciably exceed the height of a slide 4. As shown in FIG. 3, the height of the tray exceeds the height of a mount 4a only by the thickness of the bottom wall 2 plus a little more than the thickness of the cover 7. The thickness of the bottom wall 2 may be even less than the thickness of the cover 7. The leaf springs 8 need not contribute anything to the height of the tray.

Due to its small height, the tray is preferably provided with additional guide means to insure proper entry of slides 4 into the respective compartments 3A while the slides move under the action of the slide changer 6. Such guide means are provided for the upper and lower edges of the mounts 4a and include a rounded or chamfered outer marginal portion 2c of the bottom wall 2 and a similarly rounded or upwardly and outwardly inclined marginal portion 7c at the underside of the cover 7. It can be said that the outer marginal portions 2c, 7c of the bottom wall 2 and cover 7 resemble hollow frusta of cones which define a relatively high inlet at the radially outermost end of each compartment 3A so that a mount 4a which has been allowed to turn slightly in its own plane during movement from projection position back into the respective compartment 3A is highly likely to find its way into the tray by engaging the guide means 2c or 7c before its major portion begins to enter the compartment.

FIG. 4 shows a portion of a second round tray which is preferably designed for gravity feed of successive or selected slides 4 to the projection position. As a rule, the construction of round trays for gravity feed of slides is simpler than the construction of trays (see FIGS. 1 to 3) wherein one or more slide changers transport slides radially out of and back into the respective compartments. A slide projector which utilizes trays for gravity feed of slides has a chute or duct located at a level below the tray and adapted to receive and guide a descending slide to the projection position. A suitable mechanism is provided to return a slide from such projection posiition into the respective compartment by simply lifting the slide in a plane which includes the axis of the tray.

The tray of FIG. 4 comprises partitions 10 which define compartments or passages 10A having a constant width throughout. To this end, each partition 10 constitutes a sector whose width, as considered in the circumferential direction of the tray, increases gradually from the inner toward the outer ends of the adjacent compartments. The partitions 10 of FIG. 4 are shown as having wedge-shaped inner and outer axially parallel edge portions 10a, 10b, but such configuration of the edge portions is optional, especially if the compartments 10A are designed to receive slides 4 from above. The tray including the partitions 10 of FIG. 4 also consists of synthetic plastic material; however, it is evident that this tray, as well as the tray of FIGS. 1–3 and the tray shown in FIG. 5 and/or FIGS. 6–9 may consist of a metallic material or a combination of two or more different materials.

The tray including the structure of FIG. 4 can be modified in a number of ways. For example, the major portion of each partition 10 may resemble a sector or each such partition may include two or more sector-shaped portions which together constitute the major part of the respective partition. All that counts is to insure that the partitions 10 will define compartments or passages 10A each of which is at least predominantly of constant width to thus prevent excessive wobbling of slides 4 and/or of any other parts which must enter the compartments 10A while the projector using the tray of FIG. 4 is in use. The construction of the bottom wall means which holds the majority of slides 4 in the compartments 10A against gravitational descent is of conventional design and is not shown in FIG. 4; such bottom wall means is preferably held against indexing with the partitions 10 and has a slot through which a slide 4 can descend into the aforementioned duct on its way to the projection position.

FIG. 5 shows a portion of a third round tray with radially extending partitions 11 defining compartments 11A for slides 4. Each of the partitions 11 has a relatively wide sector-shaped inner portion 11c at one side of its central plane so that the flat side 11d of a partition 11 defines with the side face or flank 11e of the adjacent sector-shaped portion 11c a channel or passage 11B having a constant width and constituting the innermost portion of the respective compartment 11A. The structure of FIG. 5 can be used in round trays for gravity feed of slides 4 of for transport of slides by means of one or more radially movable slide changers. The length of each sector-shaped portion 11c can approximate one-half the length of a partition 11, as considered in the radial direction of the tray. Each of the partitions 11 of FIG. 5 has a wedge-shaped inner edge portion 11a. It will be noted that the width of the outer portion of the compartment 11A shown in FIG. 5 is a multiple of the width of the passage 11B; nevertheless, a slide 4 is properly held therein against excessive wobbling. FIG. 5 further shows that a properly inserted slide 4 can extend radially inwardly well beyond the innermost portion of the passage 11B.

The round tray of FIGS. 6 to 9 comprises an annular bottom wall 101, an inner wall 102, and an annulus of radially extending partitions 104 which define compartments 104A for slides 103. The tray consists of a single piece of synthetic plastic material; however (and this applies equally for the trays of FIGS. 1–5), it can also be assembled of discrete parts which are welded, glued or otherwise secured to each other. The inner wall 102 comprises a cylindrical portion 102a, an annular flange 102b which extends radially outwardly from the upper end of the ring-shaped portion 102a, and a plate-like central portion 102c which extends inwardly from the lower end of the ring-shaped portion 102a. The central portion 102c constitutes an optional part of the inner wall 102. The portions 102a, 102b can constitute abutments or stops for the mounts 103a of the slides 103. The bottom edge of each mount 103a rests on the upper side of the bottom wall 101.

The thickness of each partition 104 is substantially constant but each thereof is provided at both sides with wedge-shaped portions 104a, 104b so that a slide 103 which is received between the pairs of wedge-shaped portions 104a, 104b of the two neighboring partitions 104 is located in a plane which extends radially of the tray. The wedge-shaped portions 104a are adjacent to and extend in substantial parallelism with the bottom wall 101, and the wedge-shaped portions 104b extend at right angles to the bottom wall 101 and are located substantially midway between the inner and outer edge portions of the respective partitions 104. Those portions of the compartments 104A which are located above the wedge-shaped portions 104a are wide enough to receive the leading portions of the slide changers, not shown. The width of such portions of the compartments 104A (see the portions 104B, 104D of the compartment 104A in front of the foremost partition 104 shown in FIG. 6 (can greatly exceed the thickness of a mount 103a.

The tray of FIGS. 6 to 9 is further provided with yieldable means for preventing or obstructing accidental movements of slides 103 radially outwardly from the respective compartments 104A. Such obstructing means should not interfere with movements of the slide changers and/or with movements of selected slides to and from a projection position. In the tray of FIGS. 1 to 3, such yieldable obstructing means includes the leaf springs 8. The tray of FIGS. 6 to 9 dispenses with the leaf springs or other discrete biasing elements and employs partitions 104 parts of which are elastic, especially in the lower regions of their radially outermost portions. As shown, each partition 104 is formed with a radially inwardly extending slit 105 which is at least substantially parallel to the bottom wall 101. That part of each partition 104 which is located below the respective slit 105 is bifurcated to form two elastic prongs or arms 104c separated from each other by a narrow gap 204c. The outer side of each arm 104c has a wedge-like or arrowhead-shaped protuberance 104d which extends toward the protuberance 104d of the arm 104c on the adjacent partition 104. The protuberances 104d have substantially vertical facets 104e, 104f along which the mounts 103a of slides 103 respectively move during removal and insertion of slides 103 into the respective compartments 104A. The arms 104c are sufficiently elastic to readily yield to the action of one or more slide changers during removal of slides 103 from or during reinsertion of slides into their compartments. On the other hand, the resistance of the arms 104c to deformation suffices to prevent unintentional movement of slides 103 radially and away from the axis of the tray.

It is clear that the partitions 104 of the tray shown in FIGS. 6 to 9 can be modified in a number of ways without departing from the spirit of the invention. For example, the slits 105 can extend vertically upwardly from the lower edge faces of the partitions and the elastic arms 104c can be located radially outwardly of such slits (rather than below the slits 105 as shown in FIGS. 6 to 9). All that counts is to provide portions of the partitions with slits, slots, cutouts, recesses or analogous means for enhancing the elasticity of selected parts of partions in order to avoid unintentional ejection of slides 103 from the respective compartments 104A.

An important advantage of the round tray of FIGS. 6 to 9 is that it can dispense with the cover 7 and springs 8 of the tray shown in FIGS. 1 to 3 without, however, reducing its ability to properly hold the slides in the respective compartments against accidental movement radially outwardly or to properly hold the slides during substantial tilting or even a complete inversion of the tray. The portion 102b can perform the function of the cover 7, and the elastic arms 104c can perform the functions of the leaf springs 8. Thus, the entire round tray of FIGS. 6 to 9 may consist of a single piece of metallic or synthetic plastic material.

Each pair of wedge-like portions 104a or 104 on a partition 104 constitutes an equivalent of the sector-shaped portion 3c of a partition 3. The portions 104a and/or 104b of adjoining or neighboring partitions 104 define passages or channels of constant width which correspond to the passages 3B or 3D of FIGS. 1 to 3. Each pair of arms 104c (with their projections 104d) also constitutes an equivalent of a sector-shaped portion 3c.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A round tray for photographic transparencies, comprising an annulus of equidistant radially extending partitions defining radially extending compartments for transparencies, each of said partitions having at least one elastically deformable part integral therewith arranged to engage and yieldably hold said transparencies in at least one of the neighboring compartments; and wall means connected with said partitions.

2. A tray as defined in claim 1, wherein said wall means comprise an annular bottom wall and wherein said elastically deformable part projects radially beyond said bottom wall.

3. A tray as defined in claim 1 for use with at least one slide changer having a leading portion of predetermined thickness, wherein at least a portion of each of said compartments has a width at least slightly exceeding said predetermined thickness so that said leading portion can enter into a selected compartment.

4. A tray as defined in claim 3, wherein said last mentioned portion of each of said compartments is adjacent to the respective passage so that said leading portion need not enter the passages of selected compartments.

5. A tray as defined in claim 1, wherein at least a portion of each of said partitions defines with the neighboring partitions at least one passage forming part of the respective compartment and having a substantially constant width.

6. A tray as defined in claim 5, wherein the width of said portions of said partitions increases radially outwardly.

7. A tray as defined in claim 6, wherein each of said portions is located at one side of the respective partition and defines the corresponding passage with the other side of the neighboring partition.

8. A tray as defined in claim 6, wherein each of said portions includes two substantially wedge-like halves extending from the opposite sides of the respective partition, as considered in the circumferential direction of the tray.

9. A round tray for photographic transparencies, comprising an annular bottom wall; a cylindrical wall axially and radially inwardly spaced from said bottom wall; and an annulus of equidistant radially extending partitions, each having the shape of an inverted L integrally connected with said walls and defining radially extending compartments for transparencies, at least a portion of each of said partitions defining with the neighboring partitions at least one passage forming part of the respective compartment and having a substantially constant width.

10. A tray as defined in claim 9, wherein said bottom wall has a predetermined width, as considered in the radial direction of the tray, which is less than the length of said partitions in said direction.

11. A tray as defined in claim 10, wherein said bottom wall has an annulus of teeth.

12. A tray as defined in claim 11, wherein said bottom wall has inner and outer marginal portions and said annulus of teeth extends along one of said marginal portions.

13. A tray as defined in claim 9, wherein each of said partitions constitutes in its entirety a sector whose width increases gradually in a direction radially outwardly so that each of said passages constitutes an entire compartment of substantially constant width.

14. A tray as defined in claim 9, wherein each of said partitions has a radially extending central plane and each of said portions includes two wedge-like halves which are mirror symmetrical to each other with reference to the respective central plane and the width of each of which increases radially outwardly.

15. A tray as defined in claim 9, wherein each of said partitions has two substantially radially extending edges and each of said portions is adjacent to one of said edges.

16. A tray as defined in claim 15, wherein said one radially extending edge of each of said partitions is adjacent to said bottom wall.

17. A tray as defined in claim 16, wherein each of said partitions has a wedge-like second portion adjacent to the other radially extending edge thereof, said wedge-like second portions of neighboring partitions defining second passages each of which has a substantially constant width and constitutes a portion of the respective compartment.

18. A tray as defined in claim 9, wherein each of said partitions has a substantially axially parallel inner and outer edge portion and at least one of said edge portions constitutes a wedge bounded by inclined surfaces which guide the transparencies and/or a slide changer during penetration into the neighboring compartment.

19. A tray as defined in claim 9, further comprising means for yieldably holding transparencies in the respective compartments.

20. A tray as defined in claim 19, wherein said means for yieldably holding comprises a discrete spring for each of said compartments.

21. A tray as defined in claim 20, wherein each of said compartments has an open end located opposite said bottom wall, said springs normally extending into said open ends of the respective compartments.

22. A tray as defined in claim 21, wherein each of said springs is a leaf spring.

23. A tray as defined in claim 22, wherein each of said leaf springs has a pair of legs inclined with respect to each other and a portion connecting said legs and engaging the transparency in the respective compartment.

24. A tray as defined in claim 21, wherein the transparencies are insertable through said open ends of said compartments and further comprising cover means separably secured to said cylindrical wall and overlying said open ends of said compartments.

25. A tray as defined in claim 24, wherein said springs are secured to said cover means.

26. A tray as defined in claim 25, wherein each of said springs is a leaf spring having a first end affixed to said cover means and an unattached second end, said cover means having abutments against which said unattached ends of said leaf springs bear in the absence of transparencies in the respective compartments.

27. A tray as defined in claim 21, wherein said partitions have substantially radially extending edges flanking the open ends of the respective compartments and provided with notches for the respective springs.

28. A tray as defined in claim 9, wherein said annular bottom wall has a chamfered outer marginal portion to guide the transparencies during movement radially toward the axis of the tray and into the respective compartments.

29. A tray as defined in claim 28 further comprising cover means separably secured to said cylindrical wall opposite said bottom wall and having a substantially frustoconical outer marginal portion to guide the transparencies during movement toward the axis of the tray and into the respective compartments.

30. A tray as defined in claim 9, wherein each of said partitions has at least one elastically deformable part arranged to engage and yieldably hold the transparency in at least one of the neighboring compartments.

31. A tray as defined in claim 30, wherein each of said elastically deformable parts is bifurcated.

32. A tray as defined in claim 30, wherein each of said parts constitutes a section of said portion of the respective partition.

33. A tray as defined in claim 9, whrein said partitions are integral with said walls.

34. A tray as defined in claim 33, wherein said partitions and said walls consist of synthetic plastic material.

35. A round tray for photographic transparencies, comprising an annulus of equidistant radially extending partitions defining radially extending compartments for transparencies, each of said partitions has at least one elastically deformable part arranged to engage and yieldably hold said transparencies in at least one of said neighboring compartments, each of said partitions having an inner and an outer edge, as considered in the radial direction of said tray, and said elastically deformable parts constitute arms which are nearer to the outer than to the inner edges of the respective partitions; and wall means connected to said partitions.

36. A round tray for photographic transparencies, comprising an annulus of equidistant radially extending partitions defining radially extending compartments for said transparencies, each of said partitions having at least one elastically deformable part including at least one wedge-like protuberance extending into the neighbouring compartment and arranged to engage and yieldable hold said transparencies in at least one of the neighbouring compartments; and wall means connected with said partitions.

37. A tray as defined in claim 36, wherein each of said protuberances has two facets extending in substantial parallelism with the axis of the tray and being inclined with respect to each other.

38. A round tray for photographic transparencies, comprising an annulus of equidistant radially extending partitions defining radially extending compartments for transparencies, each of said partitions having at least one elastically deformable part arranged to engage and yieldably hold said transparencies in at least one of said neighboring compartments and each of said partitions having a slit adjacent to and enhancing the deformability of the respective elastically deformable part; and wall means connected to said partitions.

39. A round tray for photographic transparencies, comprising an annulus of equidistant radially extending partitions defining radially extending compartments for transparencies, each of said partitions having at least one elastically deformable part arranged to engage and yieldably hold said transparencies in at least one of the neighbouring compartments; and wall means connected with said partitions, said wall means comprising an annular bottom wall and a ring-shaped inner wall having a radially outwardly extending flange overlying but spaced apart from said bottom wall, said compartments and said partitions extending between said flange and said bottom wall, as considered in the axial direction of the tray.

40. A tray as defined in claim 39, wherein said walls are integral with said partitions.

* * * * *